March 13, 1962  H. W. ASCHINGER  3,024,615
UNDERWATER SURVEYING APPARATUS
Filed Aug. 14, 1959  3 Sheets-Sheet 2

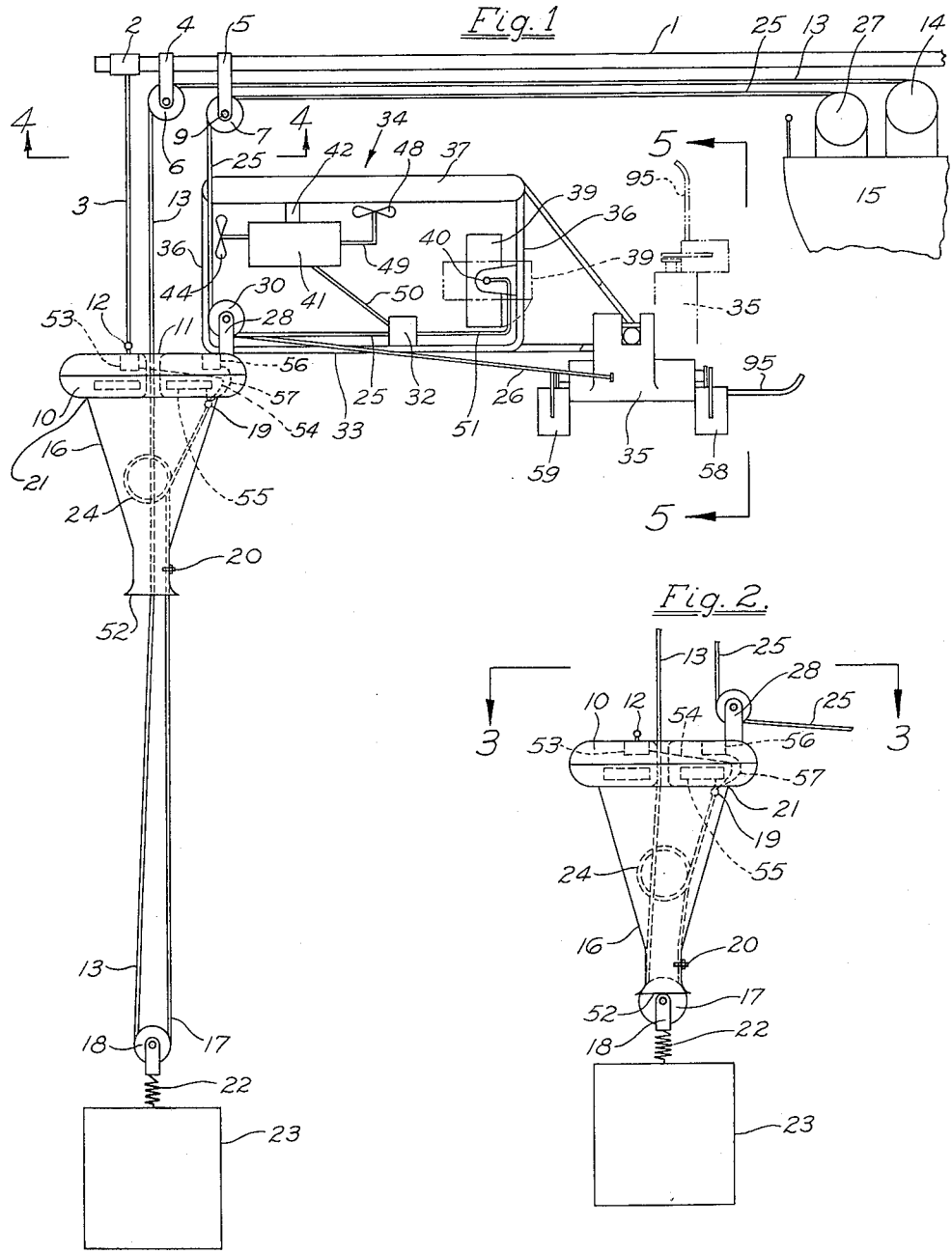

INVENTOR.
Harold W. Aschinger
BY Carl Huber Attorney
John S. Kovaleir Agent.

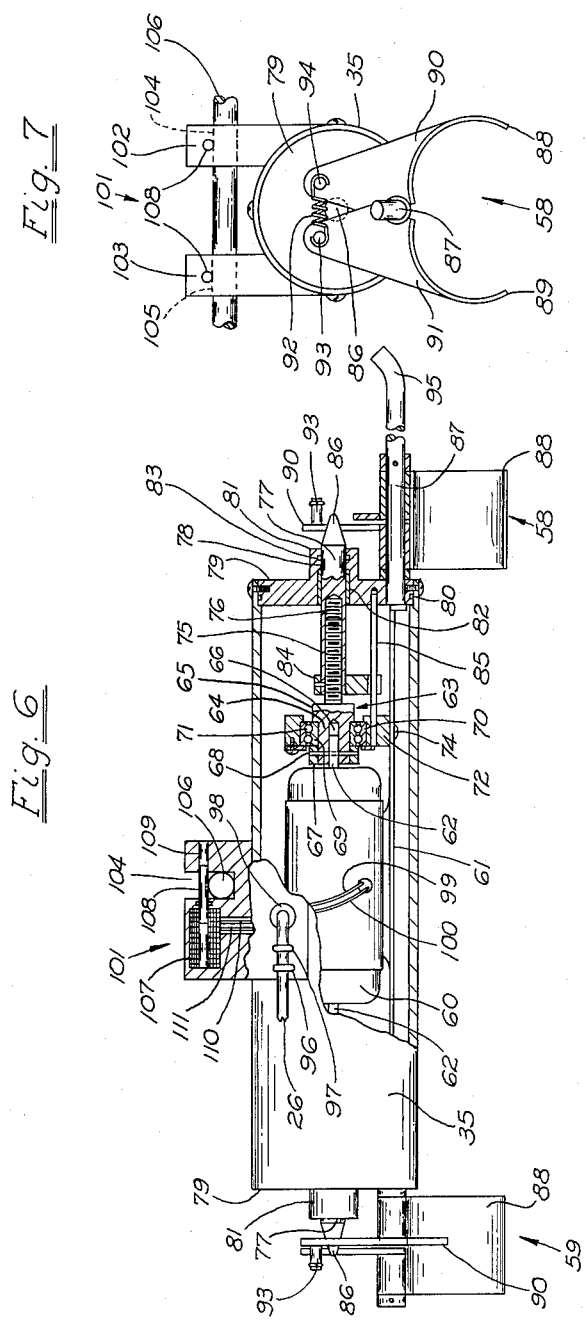

United States Patent Office 3,024,615
Patented Mar. 13, 1962

3,024,615
UNDERWATER SURVEYING APPARATUS
Harold W. Aschinger, Ridgefield, N.J., assignor, by mesne assignments, to Vare Industries, Roselle, N.J., a corporation of New Jersey
Filed Aug. 14, 1959, Ser. No. 833,774
5 Claims. (Cl. 61—69)

The present invention deals with an underwater surveying and recovery apparatus and more particularly with a remotely controlled apparatus for surveying underwater terrain and locating and recovering underwater objects.

This application is a continuation-in-part of application Serial No. 833,876 filed August 14, 1959.

It is an object of the invention to provide an underwater surveying apparatus for determining exact locations of underwater objects from an established reference point.

It is another object of the invention to provide an underwater surveying apparatus including a remotely controlled vehicle for surveying operation in any direction from an established reference point.

Figure 3:
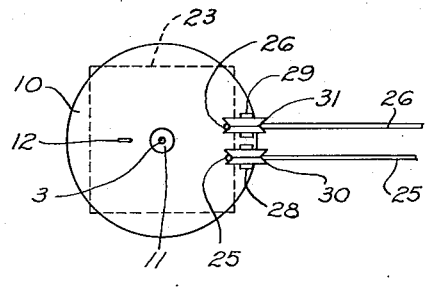
Figure 4:
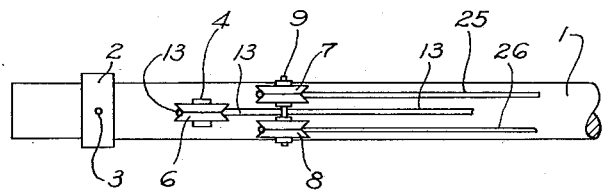
Figure 5:
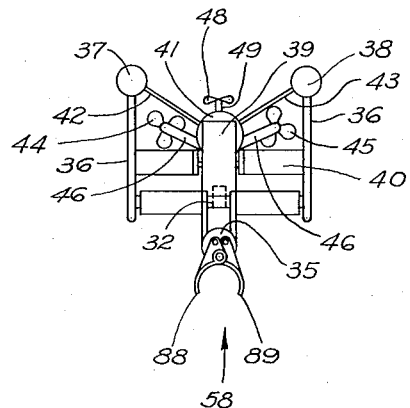

Other objects and advantages of the invention will become apparent from the description hereinafter following and the drawings forming a part hereof, in which:

FIGURE 1 illustrates a partly elevational and partly schematic view of the surveying apparatus according to the invention, FIGURE 2 illustrates a partial elevational view of FIGURE 1 showing an embodiment of the invention in a different position, FIGURE 3 illustrates a top view along lines 3—3 of FIGURE 2, FIGURE 4 illustrates a bottom view along lines 4—4 of FIGURE 1, FIGURE 5 illustrates a front view of a component of the apparatus along lines 5—5 of FIGURE 1, FIGURE 6 illustrates a partly elevational and partly cross-sectional side view of an embodiment of the invention, and FIGURE 7 illustrates an end view of FIGURE 6.

The invention deals with an underwater surveying apparatus remotely controlled from a surface vessel, whereby a remotely controlled underwater vehicle operates from an established reference point and surveys the underwater terrain to provide an exact directional location of an underwater object from the established reference point.

Regarding the illustrations, the apparatus of the invention incorporates a surface cable support means 1 in the form of an elongated horizontal bar or boom, or the like, mounted on a surface vessel. The free end portion of the boom or support 1 comprises a cable band 2 to which is connected a fixed length of cable 3 and a pair of pulley blocks 4 and 5 spaced from each other longitudinally of the boom 1. The pulley block 4 comprises a single sheave 6, while the pulley block 5 comprises a pair of laterally spaced independently rotatable sheaves 7 and 8 mounted on a common shaft 9.

A hollow toroidal buoy 10 having a control guide passage 11 therethrough is supported by the cable 3, which is attached to a releasable clamp 12 on the surface of the buoy.

A first insulated substantially heavy electrically conducting cable leads from a winch 14 on the deck of surface vessel 15, through the pulley block 4, over sheave 6, through the passage 11 of buoy 10 including the funnel-shaped buoy guide 16, over a sheave 17 of swivel block 18 and to an electrical terminal 19 on buoy 10. In order to safeguard against accidental dislodgment from terminal 19, the cable is clamped to the inner surface of funnel guide 16 by clamp 20 with sufficient cable slack 24 between the clamp 20 and terminal 19. The base 21 of funnel guide 16 is secured, e.g. by welding, to the buoy 10. The swivel block 18 has a spring member 22 depending therefrom and with a weight member, e.g. clump 23, secured to the spring 22.

Second and third insulated electrically conductive cables 25 and 26 lead from a double drum winch 27 through the pulley block 5 over sheaves 7 and 8 respectively, and each through one of a pair of releasable pulley blocks 28 and 29 on buoy 10, and over sheaves 30 and 31, respectively. The cable 25 is secured to an electrical junction box 32 on frame 33 of an underwater vehicle 34. The cable 26 is secured to a releasable motor housing 35 secured on the forward end of vehicle 34, which is illustrated in FIGURES 1 and 5. The motor housing contains a motor for performing any desirable work in addition to the surveying operation of the apparatus.

The frame 33 comprises a rectangular base having uprights 36 at its corners and with a pair of laterally spaced buoyancy tanks 37 and 38 supported by the uprights, a movable television camera 39 is supported on a swivel 40 connected between two forward uprights 36, and an electrical motor housing 41 is supported between the tanks 37 and 38 by means of braces 42 and 43 connected to the tanks. A pair of propellers 44 and 45 are connected to the motor housing 41 and are spaced laterally of each other and extend outwardly of the motor 41 by means of extensions 46 and 47, and a third propeller 48 is connected to the motor housing 41 and extends vertically or upwardly thereof by means of extension 49. Electrical conductors 50 and 51 lead from the junction box 32 to the motor housing 41 and television camera 39, respectively.

In operation, the fixed length of cable 3 secured to the band 2 on boom 1 is connected to the buoy 10 by means of releasable clamp 12 while on the deck of vessel 15. The clump 23 and funnel guide 16 of buoy 10 are in the position shown by FIGURE 2, except that cable 3 is connected to clamp 12. Cables 25 and 26 pass through releasable pulley blocks 28 and 29 secured to the buoy 10 and which cable-pulley block combination secures the vehicle 34 to the buoy 10, as shown by FIGURE 1. The boom 1 is operated to swing horizontally overboard while supporting the combined buoy, clump and vehicle. When positioned over the side of the vessel, winches 14 and 27 are operated to lower the buoy, clump and vehicle to the water surface, with the cable 3 substantially fully extended. The winch 14 is then operated to lower the clump 23, which causes swivel sheave 17 to disengage from funnel guide seat 52, and the clump is lowered by releasing the cable 13 over swivel sheave 17 until the clump 23 reaches the underwater floor while the end of the cable 13 is secured to the buoy guide 16, as at 19 and 20. A meter, not shown, indicates the length of cable expended and consequently the depth at which clump 23 rests. A switch associated with cable 13 is operated and energizes solenoid 53 through conductor 54 connected to buoy terminal 19. The solenoid 53 releases the clamp 12 and the winch 14 is again operated to take up cable 13, which pulls the buoy 10 and vehicle 34 downwardly to the clump 23. At the same time, the double drumwinch 27 is operated to permit cables 25 and 26 to expend under tension and follow the downward travel of buoy 10 and vehicle 34. When fully lowered, the funnel guide seat 52 engages the swivel sheave 17 and permits a strain on spring 22, thereby maintaining tension on the clump cable and reducing sway on the clump cable caused by currents and waves.

Having placed the buoy 10 at the reference point established by the position of clump 23, the double drum winch 27 is operated to further release cables 25 and 26 and an electrical control system on the vessel 15 is operated to electrically energize the motor propellers 44, 45 and 48 and the television camera 39 through junction box 32 and conductors 50 and 51, respectively. Propellers 44 and 45 propel the vehicle 34 outwardly of the buoy 10 and steer the vehicle to the left or right depending on the variable alternately increasing and decreasing thrust of the propellers as controlled from the deck of vessel 15. At the same time, since the vehicle 34 is positively buoyant by means of buoyancy tanks 37 and 38, the vertical propeller 48 is controlled to either raise or lower the vehicle, or to permit it to hover by controlling the speed of propeller 48 to overcome the positive buoyancy of the vehicle. Simultaneously, the television camera 39 is operating and a television receiver on the deck of vessel 15 permits visual direction of the vehicle 34 and suitable operation of the vehicle motivating means, consequently, the remotely operated vehicle is capable of surveying the underwater floor. Since the depth of the reference point is established by the expended length of cable 13, the range of the vehicle is established by the length of either expending cables 25 and 26, and the azimuth is determined by means of rotation of buoy 10 to which guide sheaves 30 and 31 are connected. The azimuth or rotation of buoy 10 is electrically indicated on board the vessel 15 by means of the response of the gyro or compass 55 electrically connected to terminal 19 on buoy 10.

After surveying, the winch 27 is operated to rewind cables 25 and 26 to return the vehicle to its position on the buoy at the location of the pulleys 28 and 29, and winch 14 is operated to expend cable permitting the buoy 10, buoy guide 16, and vehicle 34 to rise to the surface. At the surface, the buoy 10 is secured to cable 3 and winch 14 is reversed to take in cable 13 and raise the clump 23.

Alternately, the buoy 10 and vehicle 34 may rise to the surface independently. In such case, instead of returning the vehicle to the buoy after surveying, a switch on the vessel 15 is operated to energize solenoids 56 connected to terminal 19 by conductors 57, and thereby releasing the pulleys 28 and 29 from the buoy. Thereafter, the cables 25 and 26 are rewound on the winch 27 while the vehicle is caused to rise either by means of its positive buoyancy or such buoyancy together with the action of propellers 44, 45 and 48.

When it is desirable to recover underwater objects, the motor housing 35 is provided with two clamps 58 and 59 operatively associated with motor 60 contained and mounted in the motor housing 35 as illustrated by FIGURE 6. The motor is secured to motor mount 61 and comprises a shaft 62 extending outwardly of both ends of the motor. A screw member 63 is mounted on both ends of the shaft 62. The screw member comprises a cylindrical head portion 74 having a collar 65 spaced from the end of the head 64 and with a bore recess 66 in the end of the head. A collar 67 is mounted on the shaft 62 and retained thereon by means of a pin 68 passing through the shaft and collar. The end of the shaft is positioned in the bore 66 and retained therein by the collar 67 and pin 68. Inner and outer ball bearing races 69 and 70, with ball bearings 71 therebetween, are mounted on the screw head 64, with a bearing housing 72 over the outer race 70 and positioned between collars 65 and 67. The bearing housing 72 is fixed to the motor mount 61 by retainer 74. The threaded screw shank 75 extends into a threaded bore 76 of a cylindrical plunger 77 mounted through an aperture 78 through end closure plate 79 hermetically closing an end of the motor housing 35 by means of elastic O-rings 80 between the housing and end plate. The end plate is provided with an outwardly extending central boss 81 through which aperture 78 passes and through which boss the plunger passes. The boss 81 is provided with an inner bearing 82 in which the plunger 77 rides.

As the screw 63 turns within the plunger bore 76, the plunger rides axially inwardly and outwardly of the boss 81, which is rendered effectively sealed between the bearing 82 and plunger 77 by means of O-rings 83. The plunger is prevented from rotating by means of a yoke 84 secured to the plunger and axially slidable on guide rod 85 mounted below the screws 63 and axially thereof, the guide rod is secured to the bearing housing 72 and end closure plate 79. The end portion 86 of plunger 77 is tapered, e.g. is conical in shape.

A bearing stud shaft 87 is mounted on the outer surface of closure plate 79 below the boss 81 and extends outwardly of the plate axially of the plunger 77. A pair of jaws 88 and 89 forming clamp 58 are pivoted on the stud shaft 87. The jaws 88, 89 each are provided with arms 90 and 91, respectively, extending upwardly beyond the plunger 77. The free ends of the jaw arms are connected to each other by a spring 92 anchored to each arm by spring retainers 93 and 94, the spring tension normally urging the jaws 88 and 89 in open position. The tapered end 86 of plunger 77 is positioned to pass between the arms 90 and 91 and in contact therewith. As the plunger 77 moves into engagement with the arms 90 and 91, the tapered surface of plunger end 86 causes the jaw arms to spread and the jaws to close.

As stated above, the shaft 62 extends outwardly of both ends of the motor 60 and one end of the motor shaft is provided with the above-described linkage for operating clamp 58. The other end of the shaft 62 is connected to identical linkage for operating clamp 59 positioned at the other end of the motor housing 35. A finger member 95 extends forwardly of stud shaft 87.

As hereinbefore described, the motor housing is mounted on the end of frame 33 of vehicle 34, and the cable 26 is connected to the motor housing. The cable 26 is anchored to the housing 35 by anchor clamps 96 and 97 and passes through the wall of motor housing 35 through a seal member 98. Electrical conductors 99 and 100 of cable 26 are connected to the motor 60.

A coupling means 101 comprising a pair of laterally spaced shoulders 102 and 103 is mounted on top of the housing 35. The shoulders are each provided with recess 104 and 105 and a bar 106 is seated in the recesses and secured to the frame 33. Each shoulder 102 and 103 contains a solenoid 107 having a core armature 108 normally urged to bridge each recess 104 and 105 and nest in a receptive bore 109, with the armatures positioned above the bar 106 and locking the bar in the recesses. Electrical conductors 110 and 111 of the cable 26 are electrically connected to the solenoids 107. The entire housing 35 is vertically rotatable on the bar 106.

In operation, the vehicle 34 moves to an underwater object which is positioned in contact with the finger 95. The finger travels along the object until both clamps 58 and 59 are positioned to embrace the object regardless of its position since the entire motor housing assumes the position of the object. When in proper position, the motor 60 is motivated and the clamps 58 and 59 close over the object, the closure of the clamp jaws being accomplished by the forward traverse of plunger 77 as hereinbefore described. Having secured the clamps over the object, the vehicle 34 is disengaged from the motor housing 35 by activating the solenoids 107 releasing the coupling 101 from the bar 106, and the vehicle is released from the buoy 10 by disengaging pulley block 28 from the buoy, whereby the vehicle is free to surface. The cable 26 is then disengaged from buoy 10 by means of releasable pulley block 29, and the object is now connected only to cable 26, for lifting and recovery by means of winch 27. The clump 23 and buoy are surfaced as hereinbefore described.

Various modifications of the invention are contemplated within the scope of the appended claims.

What is claimed is:

1. Underwater recovery apparatus comprising a surfaced support means, a pair of electrically conductive cables connected to the support means, an underwater vehicle having a motor housing detachably secured thereto, one of the cables being connected to the vehicle, the other cable being connected to the motor housing, a motor mounted in said motor housing, clamp means, linkage means connecting the motor and clamp means, the motor housing cable being electrically connected to the motor, a coupling connecting the motor housing to the vehicle, and electrical release means electrically connecting the said motor housing cable and coupling.

2. Underwater recovery apparatus according to claim 1, wherein said linkage comprises a motor shaft, an apertured end closure plate on the housing, a plunger member connected to the shaft and means permitting movement of the plunger axially of the shaft, the plunger passing through the end closure aperture, the clamp means comprising a pair of jaws pivoted on a shaft connected to the motor housing, a pair of arms on each jaw, the plunger being positioned between the arms and in contact therewith, whereby axial movement of the plunger between the said arms motivates the jaws.

3. An underwater recovery apparatus according to claim 2, comprising a pair of clamps at each end of the motor housing.

4. An underwater recovery apparatus according to claim 3, linkage means connecting both clamps to said motor, and means permitting simultaneous motivation of said clamps.

5. An underwater recovery apparatus according to claim 1, comprising a second motor secured to the vehicle, propeller means connected to the second motor, said vehicle connected cable electrically connected to the second motor.

References Cited in the file of this patent

UNITED STATES PATENTS

| | | |
|---|---|---|
| 1,320,750 | Formiglia et al. | Nov. 4, 1919 |
| 1,997,149 | Lake | Apr. 9, 1935 |
| 1,998,165 | Munguet | Apr. 16, 1935 |
| 2,106,157 | Neider | Jan. 25, 1938 |
| 2,433,971 | Adams | Jan. 6, 1948 |
| 2,479,217 | Diamond | Aug. 16, 1949 |

FOREIGN PATENTS

| | | |
|---|---|---|
| 317,539 | Great Britain | 1929 |
| 448,735 | Great Britain | 1936 |